United States Patent [19]

Sleder et al.

[11] 4,114,583
[45] Sep. 19, 1978

[54] TRIGGERED IGNITION SYSTEM FOR INTERNAL COMBUSTION ENGINES WITH ANTI-REVERSERUNNING CONTROL

[75] Inventors: Richard L. Sleder, Fond du Lac; Robert C. Schmiedel, Oshkosh, both of Wis.

[73] Assignee: Brunswick Corporation, Skokie, Ill.

[21] Appl. No.: 619,784

[22] Filed: Oct. 6, 1975

[51] Int. Cl.² ............................................. F02P 5/08
[52] U.S. Cl. ........................... 123/148 CC; 123/148 S; 123/149 C; 310/70 A
[58] Field of Search ......... 123/148 S, 148 CC, 149 C, 123/179 BC, 185 A, 185 B, 185 BB; 310/70 A, 74, 153, 168

[56] References Cited

U.S. PATENT DOCUMENTS

| | | | |
|---|---|---|---|
| 1,480,601 | 11/1934 | Stickel | 123/185 A |
| 2,806,156 | 9/1957 | Phelon | 310/70 A |
| 2,906,251 | 9/1959 | Soder, Jr. | 123/117 R |
| 3,192,439 | 6/1965 | Shaw | 310/153 |
| 3,508,116 | 4/1970 | Burson | 123/146.5 A |
| 3,554,179 | 1/1971 | Burson | 123/148 CC |
| 3,599,615 | 8/1971 | Foreman et al. | 123/148 CC |
| 3,641,377 | 2/1972 | Fujii | 310/168 |
| 3,667,441 | 6/1972 | Cavil | 123/148 CC |
| 3,795,235 | 3/1974 | Donohue et al. | 123/148 S |
| 3,955,549 | 5/1976 | Burson | 123/148 CC |
| 3,955,550 | 5/1976 | Carlsson | 310/153 |
| 3,974,817 | 8/1976 | Henderson et al. | 123/149 C |

Primary Examiner—Verlin R. Pendegrass
Assistant Examiner—S. A. Cangialosi
Attorney, Agent, or Firm—Andrus, Sceales, Starke & Sawall

[57] ABSTRACT

A two-cylinder, two-cycle engine for an outboard motor includes a pull-rope starter unit and an alternator driven, capacitor discharge ignition system. The alternator includes an annular permanent magnet secured within a flywheel skirt and includes a pair of circumferential opposite poles with diametrical spaced neutral areas. A stator assembly is mounted within the annular magnet and includes a semicircular core with a charging coil at each end. The coils are connected to charge a capacitor unit which is discharged through a control rectifier. A trigger coil is connected to the gate of the rectifier and is mounted in coplanar relation between the chargingcoils. The trigger coil is wound on a pole aligned with and spaced from the stator core with the coil and pole rotatably mounted by a housing having an integral cam for positioning a throttle lever. The housing rotates through a selected segment of the core. The outer periphery of the segment is non-circular to form an increasing air gap with advancing throttle spark position and thereby progressively increases the minimum RPM for starting of the engine, if the throttle and spark are advanced BTDC. This ensures that the piston moves past TDC during starting for all throttle positions.

14 Claims, 3 Drawing Figures

4,114,583

TRIGGERED IGNITION SYSTEM FOR INTERNAL COMBUSTION ENGINES WITH ANTI-REVERSERUNNING CONTROL

BACKGROUND OF THE INVENTION

The present invention related to a triggered ignition system including an anti-reverse running control and particularly to an alternator driven triggered ignition system having a trigger signal generator coupled to the alternator.

With the advances in electronic technology, solid state triggered ignition systems have been developed for internal combustion engines. In low horsepower internal combustion engine applications, particularly two-cycle engine constructions, a capacitor discharge ignition system is desirable because the charged capacitor provides a relatively high voltage source which rapidly discharges through the solid state switch such as a controlled rectifier into the spark plug to produce reliable firing of the engine.

A particularly satisfactory solid state ignition system includes an alternator driven capacitor means with a triggered discharge circuit in combination with a trigger signal generator which is coupled to the alternator to provide a breakerless and distributorless multiple cylinder ignition system.

In small outboard motor and the like, the alternator and trigger generator are advantageously integrated and coupled to the engine shaft to provide the alternating charging source and trigger source in a compact configuration. A particularly satisfactory charging alternator with an integrated triggering signal generator is disclosed in the copending application of Sleder et al entitled "IGNITION BREAKERLESS AND DISTRIBUTORLESS MULTIPLE CYLINDER IGNITION SYSTEM" which was filed on Oct. 29, 1974 with Ser. No. 518,764.

An internal combustion engine is desirable started with a retard firing such that ignition occurs slightly after the piston reaches top dead center position. As the engine speed increases, however, the firing time should be advanced before top dead center position is reached. Although various electronic, as well as mechanical leverage systems have been suggested a highly satisfacotry advance means is shown in the above-entitled application, particularly where a relatively compact low profile is desired such as in low horsepower outboard motors.

The preferred embodiment of that disclosure includes an alternator built into the flywheel of a two-cylinder, two-cycle engine particularly adapted for application to an outboard motor. The main charging alternator includes an annular magnetic means secured within the flywheel skirt to form an annular rotor mounted concentrically of a stator assembly which is suitably mounted on the engine block. The rotor includes circumferentially extended and opposite polarized magnets with diametrically spaced polarity changeover points. The stator includes a semi-circular core concentrically mounted within the rotor and with charging coils and poles to the opposite core ends such that each movement of the magnetic changeover points past the coils generates capacitor charging pulses. A trigger coil is mounted, preferably in co-planar relation, between the charging coils and includes a separate pole aligned with the plane of the stator core but slightly spaced radially from the core. The trigger coil and pole are rotatably mounted in a housing having a cam which is coupled to and positions the throttle in accordance with the orientation of the housing about the stator core. The cammed housing is coupled through a suitable linkage to the throttle lever control and thus simultaneously adjusts the throttle setting and the angular position of the trigger coil which controls the timing of the engine.

Such low horsepower motors are widely constructed with pull start means wherein a starter cord is housed within a spring-loaded reel secured or otherwise coupled to the flywheel. The engine is started by rapidly pulling or extending the starter cord to spin the reel and thereby manually imparting rotation to the engine flywheel and crankshaft. When employing the integrated alternator, the starter actuation of course simultaneously provides for the corresponding operation of the alternator and trigger generator to provide the desired ignition to the engine.

Although engine driven alternators for charging of a capacitor and an integrated triggering generator provides a highly satisfactory ignition system, reverse running conditions have been encountered at starting, particularly with the application to relatively small compact two-cylinder engines such as employed in low horsepower, outboard motors.

Generally, the engine incorporated in an outboard motor or the like is designed to operate in a single, forward direction in order to properly rotate the propeller for propelling of the boat. If a reverse drive is desired, suitable reversing gears and the like can be provided. However, in such constructions it is important that the engines only operate in the forward direction in order to effect a proper controlled propulsion of the boat under reliable and complete control by the operator.

SUMMARY OF THE PRESENT INVENTION

The present invention is particularly directed to a trigger generator construction for a triggered ignition system and is particularly adapted for incorporation in a small, two-cylinder, uni-directional operating engine having a manual type starter and is particularly, uniquely constructed to eliminate the possibility of the reverse running condition arising. Thus, Applicants have found that the reverse running condition essentially arose only when the engine was started with the throttle moved to an open position and generally to the full open position with the spark advanced BTDC while slowly rotating the engine as by slowly pulling on the starter cord to start the engine. Under this combination of conditions, the inventors recognized that the engine was rotating sufficiently rapidly to generate an operative trigger signal but the small mass of the flywheel crankshaft and piston was insufficient to carry the piston over top dead center after such early ignition, such that the piston was driven by the firing in the reverse direction. As a result, the engine started to rotate in the reverse direction and would, in fact, run backwards. Generally, in accordance with the present invention, the reluctance of the flux path of the trigger coil means is varied with the throttle and spark position to establish an increasing reluctance as the throttle and spark advances. The reluctance is conveniently controlled by varying of the working air gap with a relatively large air gap at maximum throttle and spark. In addition, the trigger generator means is arranged and constructed to require a minimum revolution per minute (RPM) before the amplitude of the output is sufficient to actuate the control circuit. The inventors have found that the changing air gap with throttle and spark position effectively eliminates the reverse running condition and is particularly effective with the minimum RPM set at a selected level significantly above slow pulling of the starter cord.

More particularly, in a preferred embodiment of the present invention as applied to an integrated power alternator and a trigger generator construction, the trigger coil means is mounted in a suitable housing and coupled through the throttle control for angular orientation along a circular path about a common stator core having an outer peripheral core surface concentric of the circular path. The stator core is formed with a chordal portion removed in any suitable manner to define an offset core face adjacent the path of the trigger coil unit. The circumferentially positioning of the trigger coil with respect to the removed chordal portion automatically generates a progressively increasing air gap as the throttle and interconnected trigger coil moves to the advance position.

In a particularly practical construction, the chordal portion was located with the starting point at approximately the top dead center of the triggering coil and extended in the advance firing direction, with the center of the chordal portion aligned with the most advanced throttle position. The idle and after top dead center slow run position are maintained with a constant and relatively small air gap. This, of course, establishes a relatively low reluctance flux path and provides generation of a suitable trigger signal at very low starting rotation. However, ignition is then established after the piston has reached or passed top dead center and, consequently, there is essentially no danger of a reverse running condition being generated. As the throttle is advanced or opened and the coil unit repositioned to effect firing before top dead center, the air gap increases. Just before top dead center throttle position, a somewhat greater speed is required to generate a proper amplitude trigger signal as a result of the slightly increased air gap. Although the speed is not significantly greater than the minimum speed, it is sufficient to ensure that the momentum of the engine is sufficient to carry the piston over top dead center and thereby ensure only forward rotation or running of the engine. As the throttle is moved to the full open position, the air gap will progressively increase to a maximum at full open throttle position. At this throttle setting, a significantly increased starter speed is required and one which will ensure that the momentum of the engine is sufficient to carry the piston over top dead center and, once again, ensure that the engine starts and runs in only the forward direction.

The present invention thus provides a simple and relatively inexpensive construction of the trigger signal generator means to ensure uni-directional starting of the engine. The invention is uniquely and particularly adapted to the integrated alternator and trigger generator construction of the previously identified copending application as no significant changes are required in the structural arrangment of the trigger generator other than the simple modification to the core structure by removal of a part thereof and, if desired, decreasing of the number of turns on the trigger coil. Both changes can, of course, readily be provided without undue structural changes.

BRIEF DESCRIPTION OF THE DRAWING

The drawings furnished herewith illustrates the preferred construction of the present invention in which the above advantages and features are clearly disclosed as well as others which will be readily understood from the following description of the illustrated embodiments of the invention.

In the drawings.

DESCRIPTION OF THE ILLUSTRATED EMBODIMENT

Figure 1:
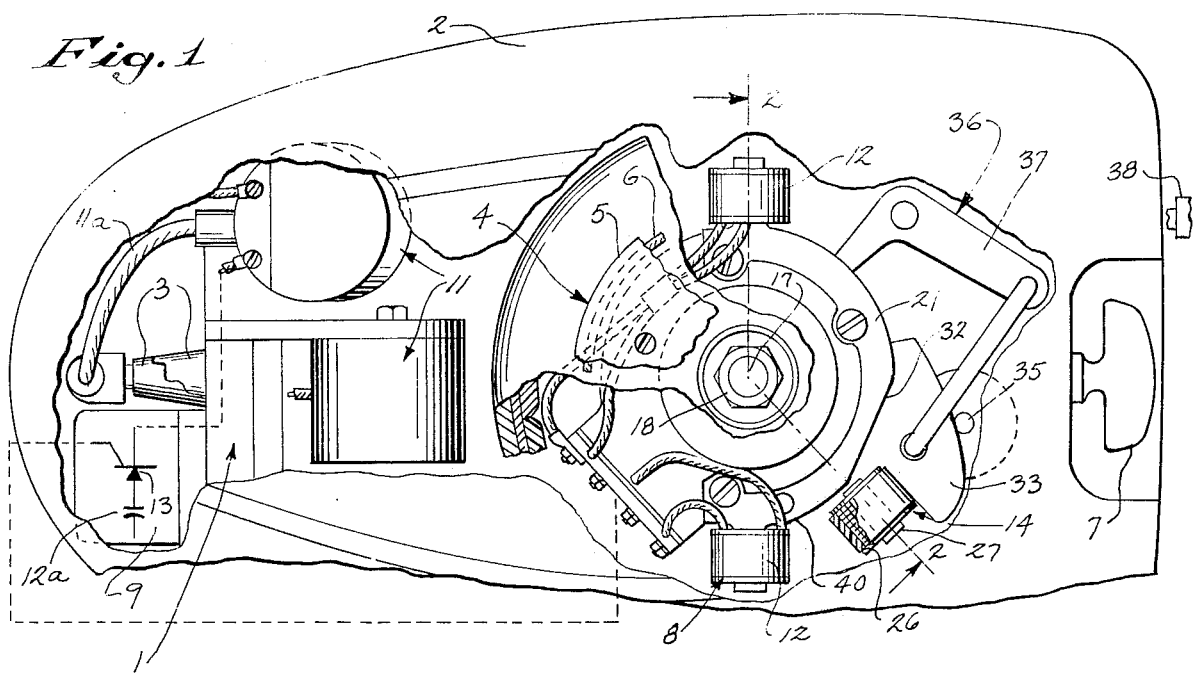
FIG. 1 is a top elevational view of an outboard motor incorporating the present invention and with parts broken away to more clearly illustrate in detail the internal structures.
Figure 2:
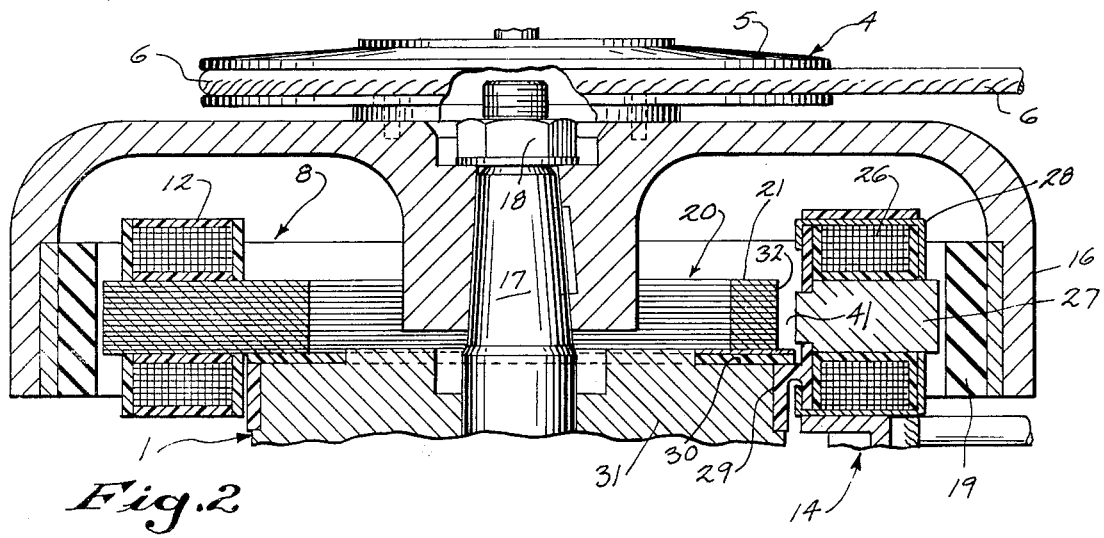
FIG. 2 is an enlarged, vertical section taken generally on lines 2—2 of FIG. 1 to clearly illustrate the present invention.

Referring to the drawing and particularly to FIG. 1 a fragmentary portion of the upper power head of an outboard motor is shown in which an internal combustion engine 1 is mounted on a lower drive shaft unit, not shown. The engine 1 is enclosed within a suitable protective and decorative cowling or housing 2. The engine 1 is of any suitable construction and is preferably the usual two-cycle, internal combustion engine widely employed in the outboard motor industry. The engine 1 is connected through any suitable means to a propeller drive mechanism, not shown, at the lower end of the unit. The outboard motor is designed such that engine 1 should only operate in a forward direction of rotation to properly rotate the drive mechanism.

The engine, for a typical horsepower outboard motor, may be a two-cylinder engine 1 having a pair of in-line cylinders with individual spark plugs 3. The illustrated outboard motor is shown with a manual rope starter unit 4 secured to the upper end of the engine 1. The starter unit 4 may be of any conventional or desired construction, and generally includes a spring-loaded recoil sheave 5 within which a rope 6 is wound. Rope 6 extends outwardly from the sheave 5 through the cowl 3 to a T-shaped handle 7.

In FIG. 1, an alternator unit 8 is mounted directly within a flywheel assembly 9 of the engine 1 and connected to a capacitor discharge ignition box 10, the output of which is connected via a pair of transformers 11 to the spark plugs 3. The ignition output thereby sequentially and alternately fires the spark plugs 3 of the engine 1, and thereby provide continued and proper unidirectional engine operation.

Generally, the alternator unit 8 includes a pair of charging windings 12 which are connected through a charging circuitry to selectively charge a capacitor unit 12a which is discharged through the transformers 11 to the associated spark plugs 3 by firing of a solid state switch, shown as a controlled rectifier 13. A trigger generator unit 14 is connected to control the switch 13 in timed spaced sequence to produce alternate and proper firing of the spark plugs 3. A suitable circuit is shown in the previously identified application and, because any suitable trigger circuit may be employed with the novel trigger generator unit 14, no further description or illustration is given.

The present invention is particularly directed to the construction of a trigger generator unit 14 which forms an integrated part of alternator unit 8 for a solid state ignition system for firing of the engine. Consequently, no further detailed description of the engine or particular ignition system is given other than that which contributes to more clearly describing of the construction and operation of the new and novel triggering generator construction.

More particularly, alternator unit 8 is connected directly as an integrated part of the engine's flywheel 16 which, in turn, is secured to the upper end of the engine's crankshaft 17. The flywheel 16 is a generally inverted cup-shaped member having a central hub keyed to the crankshaft 17 and locked in place by a clamping nut 18.

The alternator unit 8 includes an annular permanent magnet unit 19 connected to the inside of the depending flywheel skirt to form a magnetic rotor which rotates about a stator unit 20, mounted concentrically of the crankshaft 17 and within the flywheel 16. The capacitor charging windings 12 are wound on the opposite pole ends of a semi-circular laminated magnetic core 21 mounted to the top of engine block 22.

Figure 3:
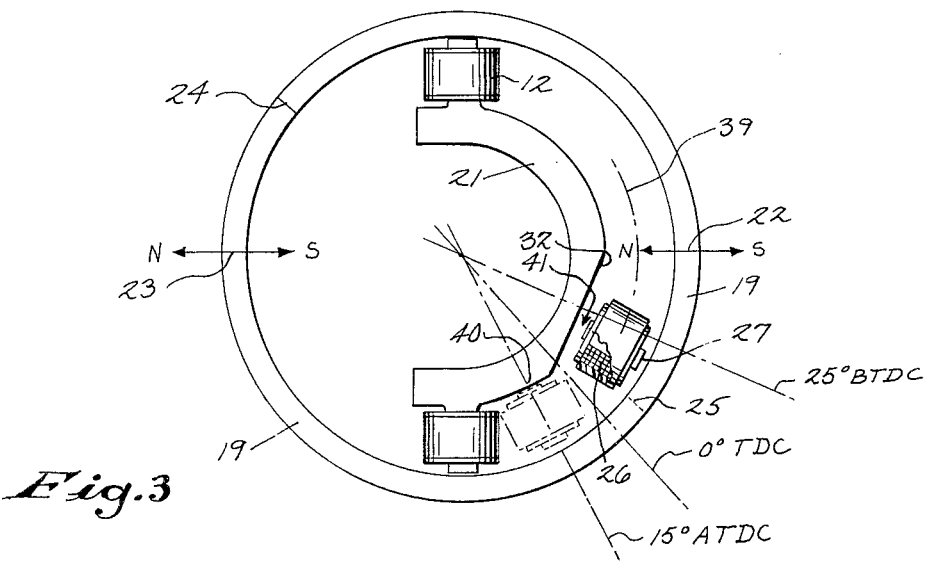
FIG. 3 is a simplified diagrammatic view of an alternator-trigger unit shown in FIGS. 1 and 2 to clearly illustrate an embodiment of the invention.

The annular magnetic unit 19 is oppositely polarized to form a pair of semi-circular permanent magnets, as shown in FIG. 3, by appropriate polarity dots 22 and 23. The rotation of the flywheel 16 results in the sequential movement of magnetic neutral or changeover zones 24 and 25 past the similarly spaced windings 12 to provide charging pulses in the windings.

The trigger generator unit 14 includes a trigger coil 26 which is mounted on a circumferentially movable pole 27 and generally located intermediate the two charging coils 12 and in a common plane with the periphery of core 21. As a result, the trigger coil 26 is coupled to one of the zones 24 and 25 after each coupling thereof to the charging windings 12. The coil 26 generates a discharge or trigger signal before the charging windings 12 and 13 are again coupled to the neutral zones. The particular timing of the ignition is determined by the circumferential spacing an angular orientation of the trigger coil 26 with respect to the charging coils, as more fully discussed in the previously identified Sleder et al application and briefly summarized as follows.

The coil 26 and pole 27 are mounted within a trigger housing 28 which is rotatably mounted for adjustment of the firing between a retard position for idle and low speed and an advance position for high speed operation of engine 1. The housing 28 includes an interconnected mounting ring 29 having an inner diameter generally corresponding to the diameter of a peripheral ledge 30 provided on the engine block 31. The ring member 29 is releasably and rotatably clamped upon the ledge by the core 21.

The position of crankshaft and zones 24 and 25, in turn, are directly related to the relative position of the piston units, not shown, within the engine cylinders such that the mechanical positioning of the coil 26 establishes a relative retard or advance trigger signal to provide a desired ignition timing change.

In the embodiment of the present invention, the core 21 is shown with a cutout portion 32 on the outer periphery defining a flat, chordal pole portion with respect to the circular path traveled by coil 26 and pole 27 between the retard and advance signal positions. As more fully developed hereinafter, this ensures that the engine will start in only the forward direction.

The timing coil 26 is positioned by a timing cam plate 33 which is shown integrally formed on the outer periphery of the trigger housing 28 and extends as a horizontal plate member. The outer cam edge of cam plate 33 curves rearwardly and inwardly to the ring. A throttle lever for the carburetor 34 has a cam follower 35 riding on the cam edge and connected to control the throttle position. The timing cam plate 33 is connected through a suitable linkage 36 to a throttle control lever 37. For small two-cylinder engines, a manually rotated handle 38 may be provided and coupled through suitable gearing mechanism to rotate the control lever 37 and thus provide a desired timing and throttle control.

The trigger coil 26 is thereby moved along a circular path, as shown in phantom at 39, between a retard position and an advance position, as shown in phantom in FIG. 3, and, in so moving, is variously aligned with the circular portion 40 and the cutout portion 32 of core 21.

The peak of the signals in the trigger coil 26 is spaced from the peak of the signal generated in the charging coils 12 and 13 by the angle between the coils, as shown. This angle is, of course, adjustable between an advance retard angle and any predesigned maximum advance angle with the throttle setting for optimum firing. In actual construction, 40° movement may include a maximum advance of 25° (before top dead center BTDC) and a retard of approximately 15° (after top dead center ATDC) is employed.

The housing 28 and ring 29 accurately locate the trigger pole 27 with respect to the laminated U-shaped core 21 and the annular magnets. Thus, the working air gap 41 between the core and the coil can be held to a minimum with efficient coupling to coil 26.

The precise point of ignition is determined by the mechanical setting of the trigger coil 26. Thus, as the throttle control is positioned, to accelerate the engine 1, the trigger coil 26 rotates to an advance position, simultaneously with the interconnected cam 33 operating the throttle 35.

The core 27 is spaced from the stator core 21 with a working air gap 41 between the periphery of the core 21 and the trigger core 27. With the coil 26 aligned with the circular portion 40, a relatively small air gap 41 is defined and a relatively low or minimum reluctance path for the magnet flux of the aligned permanent magnet 22 or 23. As a result when a neutral zone 24 or 25 passes pole 27, a significant and rapid change in flux occurs with a corresponding generation of a pulse signal in the same manner as described in the previously identified application. The circular portion 40 is located to extend throughout the low speed and idle range of the throttle setting for the outboard motor. The cam linkage 36 establishes adjustment along the circular path 39, as shown in FIG. 3, and maintains a constant air gap 41 until such time as the coil 26 is moved in alignment with the cutout portion 32. In a practical application the circular portion will cover from 0° to 15° after top dead center, corresponding to idle and low speed operation of the engine.

As the throttle input is positioned to accelerate the engine 1, the trigger generator unit coil 26 is further rotated, in a counterclockwise direction as viewed in FIG. 3 and moves along the circular path 39 into alignment with the cutout or offset portion 32. In this throttle position, firing occurs before top dead center and increasingly so as the throttle is further opened to provide increasing speed conditions. During such high speed operation, however, the working air gap 41 increases in accordance with the removed or chordal construction of the core portion 32. The increase in the length of the working air gap 41 significantly decreases the flux through the core 27 as each neutral zone 24 and 25 is rotated past the core or pole 27. Consequently, the signal generated in the coil 26, for any given rotational speed of the rotor, varies with the position of the trigger coil 26 and pole 27 throughout the working length of the core portion 32.

The variable air gap 41 is essentially effective only during the initial starting of the engine and functions to ensure that the inertia and momentum in the rotating parts is sufficient to move the piston past top dead during starting of the engine. This will ensure that the engine only rotates in the desired forward direction. Although the air gap is increased once the engine is started, the length of the air gap in the higher speed range does not in any way affect the operating characteristic of the engine and complete and continuous satisfactory engine operation is maintained.

For example, taking the worst case position with the throttle set to a maximum advance corresponding to full open throttle position, at which firing occurs with the piston at 25° before top dead center. If the core 27 were close coupled to the stator core 21, as shown in the circular portion 40, a signal in the coil 26 of sufficient level to fire the control rectifier 15 and create ignition within the cylinder with slow start pull. The inertia in the mass of a small engine including the piston, flywheel and associated components, may not have sufficient mass to move the piston beyond top dead center and the explosion, in effect, causes the piston to move downwardly in the cylinder effecting the reverse rotation of the crankshaft and the engine. This is particularly true in a manually operated engine where the starter cord 8 may be relatively, slowly pulled for many reasons. Such an occurrence could create a dangerous situation.

With the present invention, however, the increased air gap 41 in the portion 32 significantly modifies the required minimum RPM to generate a signal of sufficient magnitude to fire the triggered switch means such as the controlled rectifier 13.

With the variable air gap the minimum RPM required to start the engine may be made to vary directly with the advance firing position of the piston. Thus, as the throttle is closed, the coil unit 26 is moved toward the idle or retard firing position and, as a result of the chordal plane of cutout portion 32, the air gap 41 become progressively smaller. The minimum RPM for starting will be reduced but lesser mass and speed is required to ensure that the engine will move over top dead center and reliably start in the forward direction.

As previously noted, at zero degrees or after top dead center firing, there is, of course, no particular danger of reverse rotation and, consequently, the very minimum air gap 41 is established and thereby permits very easy starting of the motor with relatively slow pull on the manual starter.

In a practical embodiment, the working air gap 41 may vary between touching to 0.030 inches, with the larger gap desirable to provide maximum manufacturing tolerances in the mounting and construction of the stator and rotor. The coil 26 was wound with a minimum number of turns to provide the desired starting characteristic at low speeds. For example, a practical limitation required 150 minimum RPM which can be rather readily obtained with a manual starter and with this low speed air gap range. At full throttle the air gap is increased to approximately 0.125 to 0.155 inches. These dimensions are typical of a practical implementation and have been found to provide reliable anti-reverse engine operation. The coil 26 could, of course, be wound with even a lesser number of turns and thereby establish a minimum RPM greater than the 150 RPM; thereby minimizing the necessity for the variable working gap. However, in most practical constructions, a minimum RPM, significantly in excess of 150, would generally be considered a hard starting engine and thus would also be considered undesirable.

The present invention with the variable air gap permits the setting of the minimum RPM for starting at a relatively low level which will be readily acceptable in the commercial market while essentially ensuring the engine cannot be started in a reverse direction under all normal throttle and advance settings during the starting.

The present invention provides a highly desirable anti-reverse control as the stator core can be conveniently formed by the inexpensive and expedient production step of removing the core by cutting and the like. Further, as previously noted, the construction does not require any additional components and permits simple adjustment of similar, existing, integrated, alternator and trigger generator constructions.

The timing adjustment may, of course, be effected by providing a construction in which the stator unit rotates with respect to a fixed trigger unit, or both may move but such structure would be more complicated and expensive. Further, although shown with a progressive change in the air gap within the starting range, a step type change in the air gap might, of course, be employed. The progressive change is, of course, desirable as permitting the relatively close interrelationship between the required minimum speed at various advance throttle settings.

Although illustrated in a preferred construction, the present invention is directed to the concept of providing a properly wound coil means in combination with a variable reluctance path such as the variable working air gap to prevent reverse engine operation under all starting conditions. Thus, other means can, of course, be provided for creating the varying reluctance path with the relative setting between the trigger coil means and stator unit.

Thus, the present invention has been found to provide a very simple and economical anti-reverse engine starting construction and one which is particularly adapted to the necessary mass production of outboard motors and the like.

Various modes of carrying out the invention are contemplated as being within the scope of the following claims, particularly pointing out and distinctly claiming the subject matter which is regarded as the invention.

We claim:

1. A signal generator generating a signal proportional to speed, comprising a rotor having an input adapted to be coupled to a drive means and rotated about an axis, a stator coupled to said rotor, and including core means with a first stator core member and a second stator core member mounted in a close spaced relation, said second core member having a circular construction and mounted concentrically of said axis, said first stator core member being mounted for adjustable positioning about said axis and therefore relative to said second stator core member and changing of the working air gap between said first and second stator core members, a trigger coil means wound on said first core member to control the timing in accordance with the angular positioning of the first core member and simultaneously varying the output level of the coil means in accordance with the air gap, a speed control means providing increasing and decreasing speed setting, and ajustable means coupled to the speed control means and to said first core member to adjust the operative coupling of the setting of said first core member and thereby reduce the output level of said generator with the increasing speed of the speed control means.

2. The apparatus of claim 1 wherein said first core member includes a generally circular portion and a second offset portion extending inwardly of said generally circular portion, said first core member being mounted for selective positioning along a circular path concentric with the circular portion of said second core member and movable in alignment with both of said portions to define a constant working air gap with the speed control means in one operating range and a variable air gap with the speed control means in a second operating range.

3. The apparatus of claim 2 wherein said offset portion is defined by an offset chordal portion.

4. The apparatus of claim 1 in combination with an internal combustion engine including a manually operated starter means coupled to the drive means and the rotor, said adjustable means being connected to decrease the coupling with increased speed setting of the speed control means.

5. The apparatus of claim 4 wherein said adjustable means is constructed to maintain a constant coupling over a selected low speed range and a continuously varying coupling over a higher speed range.

6. The signal generator of claim 1 wherein said rotor is an annular member having a plurality of circumferentially extended magnet members defining circumferentially spaced essentially neutral pole positions, mounting shaft means coaxially connected to said rotor, said stator being mounted concentrically of said rotor and said second core member being a low reluctance core having pole pieces spaced slightly from the periphery of the magnet members on the rotor and having winding means mounted on each pole piece of said core, said trigger coil means is a winding located in the common plane with said charging winding means, said adjustable means establishing relative angular positioning of the trigger winding concentrically of the mounting means and said low reluctance core, said low reluctance core having an outer generally circular portion defining a constant working air gap and an offset chordal portion defining a variable working air gap to the trigger winding.

7. The apparatus of claim 1 wherein said rotor is an annular member having a plurality of permanent magnets circumferentially distributed, said permanent magnets having axially spaced poles defining a peripheral magnetic field at the periphery of the magnets, adjacent magnets being oppositely polarized to define circumferentially spaced magnetic changeover pole positions at which the polarity of the flux reverses, said stator being concentrically mounted of the rotor to the and including a laminated circular core having outwardly extended pole pieces as said second core member with end faces spaced slightly from the periphery of the magnets, power coils located on said pole pieces, a trigger coil unit having a rectilinear core as said first core member, means supporting said coil unit movably located between said stator pole pieces, said adjustable means being connected to said last named means for said coil unit for angular positioning thereof about said circular core, and the outer periphery of said circular core having offset portions within the angular orientation of said trigger coil unit to thereby vary the reluctance of the flux path through permanent magnets and the trigger coil unit to thereby vary the air gap between the stator core and the core of the trigger coil unit with speed.

8. In an ignition system for an internal combustion engine having a triggered ignition system with a minimum trigger signal threshold level for establishing a firing energy pulse, the improvement in a signal generator generating a signal proportional to speed and connected to actuate the triggered ignition system, comprising a rotor having coupling means for coupling to the engine and driven in synchronism therewith about an axis of rotation, said rotor having means to establish a rotating magnetic field, a stationary magnet core means located adjacent to said rotor and defining a flux path for said magnetic field, said core means includes a first core member and a second core member extending circumferentially of the rotor about the axis of rotation and mounted in a close spaced relation to the first core member with a working gap therebetween, said first core member being adjustably mounted with respect to said second core member to vary the air gap and thereby reluctance of the flux path, a trigger coil means wound on said first core member, and throttle control means connected said first core member to vary the position of the first core member relative to the second core member and thereby the reluctance of the flux path and thereby control the minimum rotation of said rotor to effect generation of said predetermined minimum trigger signal in said coil means.

9. The apparatus of claim 8 wherein said second core member having a generally circular portion, said first core member being mounted for selective positioning along a circular path concentric with said second core member, said second core member having a circular peripheral portion concentric of the path of said first core member to define a constant working air gap and a second offset portion extending inwardly of said circular portion and defining a variable air gap.

10. The apparatus of claim 9 wherein said offset portion is defined by a flat chordal surface of the core.

11. The apparatus of claim 8 wherein said rotor is an annular member having a plurality of circumferentially extended magnet members defining circumferentially spaced essentially neutral pole positions, mounting shaft means coaxially connects said rotor, a stator assembly mounted concentrically of said rotor and having a magnetic core forming said second core member in the plane of the rotor with pole pieces radially spaced slightly of the magnet members and having charging winding means mounted on each pole piece of said core, said trigger coil means being located in the plane of the core and having said first core member between the core and magnet member, adjustable mounting means for locating said coil means in angular position about the shaft means, said control means being connected to said mounting means relative angularly positioning of the trigger coil means and first core member with respect to said shaft means and said stator core between a retard firing position and an advanced firing position, said core having an outer generally circular pole face defining a constant working air gap and an offset chordal portion spaced from said path to define an increased air gap in the advance throttle position.

12. In an outboard motor apparatus having a pull rope starter mechanism for rotating of said engine to initiate the operation thereof and having an ignition system with a triggered switch means for discharging a firing capacitor, said engine having a cup-shaped flywheel, the combination therewith of a trigger generator for developing times spaced actuation of said triggered switch means compromising a plurality of permanent magnet means circumferentially distributed and secured within the flywheel and rotated therewith, a stator assembly mounted in fixed relationship within said flywheel and including a stator core encircling the shaft and including outwardly extending pole pieces with end faces spaced slightly from the periphery of the magnet means, power coils located on said pole pieces to provide an output for charging said capacitor, a trigger coil unit having a core member and located between said stator pole pieces, a movable mounting member for said coil unit within said rotor and mounted for limited angular positioning about the stator core and the outer periphery of said stator core including an offset portion within the limits of said angular position of the trigger coil unit and differently spaced with respect to said rotor within the angular orientation of said trigger coil unit to thereby vary the reluctance of the flux path through the permanent magnets and the trigger coil and stator core, and a speed control means coupled to said mounting member and positioning said core member of the coil unit into alignment with the offset portion in response to increased speed actuation of the speed control means to thereby reduce the output level of the trigger coil unit with increasing speed in accordance with the positioning of the trigger coil unit.

13. The apparatus of claim 12 wherein said stator core is semi-circular with end pole pieces, said offset portion being defined by a flat chordal sidewall of the stator core.

14. In the apparatus of claim 13 wherein said magnet means having axially spaced poles defining a peripheral magnetic field at the periphery of the magnets, adjacent magnet means being oppositely polarized to define circumferentially spaced magnetic changeover pole positions at which the polarity of the flux reverses.

* * * * *